March 23, 1965    R. B. LONG    3,175,018
PROCESS FOR SEPARATING ETHYLBENZENE FROM
XYLENE MIXTURES USING ANTIMONY HALIDES
Filed May 8, 1961
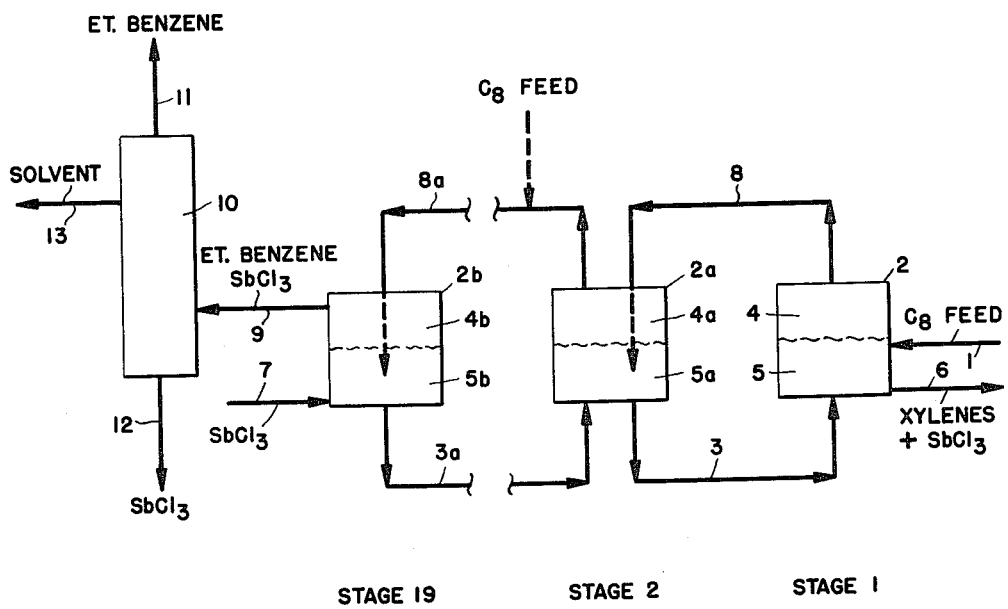
Robert B. Long    INVENTOR
BY *Seymour Stahl*
PATENT ATTORNEY

United States Patent Office

3,175,018
Patented Mar. 23, 1965

3,175,018
PROCESS FOR SEPARATING ETHYLBENZENE FROM XYLENE MIXTURES USING ANTIMONY HALIDES
Robert B. Long, Wanamassa, N.J., assignor to Esso Research and Engineering Company, a corporation of Delaware
Filed May 8, 1961, Ser. No. 108,541
11 Claims. (Cl. 260—674)

This invention relates to a process for the separation of ethylbenzene from a mixture containing it and other $C_8$ aromatics by liquid-liquid extraction employing antimony halide and a secondary solvent.

More particularly this invention relates to the separation of ethylbenzene from a $C_8$ aromatics fraction containing principally xylene isomers and ethylbenzene by contact with liquid antimony trichloride in the presence of a secondary solvent which is non-selective in character and which is less soluble in the antimony trichloride than ethylbenzene.

In the petrochemical field, especially desirable hydrocarbon compounds are usually found in complex mixtures with other hydrocarbons of similar structure and boiling point. The closely related structural and boiling point characteristics of hydrocarbons found in many mixtures make it extremely difficult to separate the desired individual components. A typical example of such a mixture is the $C_8$ aromatics fraction obtained by reforming heavy naphtha and other petroleum derived feedstocks. This mixture will generally comprise the various xylene isomers, i.e. ortho-, meta-, and para-xylene, ethylbenzene, and in some cases a few percent of non-aromatics. The boiling points for ortho-, meta-, and para-xylenes are respectively 144° C., 139.3° C., and 138.5° C., whereas ethylbenzene has a boiling point at 136.2° C. While it is commercially practicable to separate ortho-xylene from this mixture by fractional distillation, separation of the remaining $C_8$ aromatics mixture into its isomeric components is extremely difficult. While this latter separation can be effected by fractionation, the number of distillation plates required is extremely large. For example, a separation of high purity ethylbenzene from a xylene mixture by fractional distillation requires in one known process a fractionating column having a total height of about 600 feet, usually arranged as a plurality of towers having an equivalent combined height, e.g. three 200-foot towers. Operation of a fractionating column having this overall height and large number of plates is extremely costly and adds considerably to the price of the product so produced.

Aside from superfraction referred to above, there have been suggested various extraction and extractive distillation processes using antimony halides. Extractive distillation requires a fractionating tower having a number of plates sufficient to produce overhead ethylbenzene of desired purity. Antimony chloride has also been used in liquid-liquid extraction processes for this general purpose. One such process is described in a U.S. Patent to M. R. Fenske, No. 2,778,864. However, in this process all of the $C_8$ aromatics are extracted non-selectively and the extract is then fractionally crystallized to obtain the desired isomers of reasonably high purities. Crystallization techniques of this type embody various drawbacks which relate in particular to the equipment necessary for the separation of solids from liquids. Also, the handling of solids is in most cases more difficult than the processing of liquid streams.

It has now been found that antimony halides, e.g. chlorides, bromides, fluorides and iodides, when employed with a secondary solvent which is non-selective and which is less soluble in the antimony chloride than the aromatics, permit the selective separation of ethylbenzene from a $C_8$ aromatics fraction such as generally described above.

The liquid-liquid extraction process of this invention can be carried out simply by contacting the antimony chloride with the ethylbenzene containing $C_8$ aromatics fraction in the presence of sufficient secondary solvent to effect the formation of two liquid phases. It has been found that the selective extraction of xylenes from an ethylbenzene containing mixture with antimony trichloride cannot be carried out successfully in the absence of sufficient secondary solvent due to the solubilities of the aromatics in liquid antimony chloride. Generally with regard to proportions, sufficient extractant, e.g. liquid antimony chloride, to solubilize appreciable amounts of the desired ethylbenzene should be used; however, the amount of antimony chloride is preferably maintained between 25–250 vol. percent, more preferably 50–150 vol. percent, based on the aromatics in the feed. The secondary solvent should be present in an amount sufficient to produce a separate liquid phase containing a smear of the $C_8$ aromatic compounds from the mixture.

The volume ratios of antimony halide to $C_8$ aromatics fraction to secondary solvent will to a large extent determine the selectivities obtained in a single stage extraction process. For example, as the ratio of antimony chloride to aromatics increases, more of the aromatics will be solubilized in the antimony chloride but at a lower concentration and accordingly more selectivity will be achieved. On the other hand, as the ratio of antimony chloride to aromatics fraction decreases, the selectivity for ethylbenzene extraction will decrease, but the yield or quantity of ethylbenzene separated will increase. The secondary solvent, which forms the raffinate phase, takes on a similar role affecting both selectivity and overall yield in a single stage liquid-liquid extraction process. Since the secondary solvent is nonselective, and will be in most cases essentially completely miscible with all of the aromatics in the $C_8$ fraction, the tendency of the secondary solvent is to decrease the solubility of the ethylbenzene in the antimony chloride or extract layer. Hence, as the ratio of secondary solvent to antimony trichloride increases, there is an increase in yield, i.e. amount of ethylbenzene in the raffinate, with an accompanying increase in selectivity. Conversely, as the ratio of secondary solvent to antimony chloride decreases, there is an accompanying decrease in yield and decrease in selectivity.

It is to be understood that for commercial application it will be necessary to utilize multistage extraction processes and preferably refined equipment and techniques such as disclosed in the U.S. patent to Packie et al., 2,420,906.

Regarding temperature and pressure, the primary requisite is to employ conditions under which the antimony trichloride, secondary solvent and the aromatic constituents of the $C_8$ fraction are in a liquid state. Temperatures and pressures may vary between 20 to 150° C. and atmospheric to 200 p.s.i.g.

While a $C_8$ fraction comprising ethylbenzene, ortho-, meta-, and para-xylenes has been referred to, it is to be understood that this particular composition is merely representative of a commercial $C_8$ aromatics fraction obtained by various reforming processes such as Powerforming. The process recited herein is equally applicable to any ethylbenzene containing fraction where there are present one or more other aromatic components boiling close to the ethylbenzene boiling point.

The secondary solvent as indicated previously should be less miscible in the antimony trichloride or extract layer than the aromatics and preferably should not be reactive with antimony halides or the aromatics. There may be employed, for example, normally liquid paraffins, e.g. pentane, hexane, heptane, octane, and so on, up to about the $C_{20}$ range. Monoolefins are also suitable in the $C_5$ to $C_{20}$ molecular weight range. This class of course would include hexene, heptene, decene, tridecene and so forth. Additionally, 5 and 6 membered cycloparaffinic ring compounds, such as cyclopentane, cyclohexane, methyl cyclohexane, ethyl cyclohexane, and the like may be used.

In the liquid-liquid extraction referred to herein there will be obtained after contact between the antimony halide, $C_8$ aromatics fraction and secondary solvent, extract and raffinate phases. Since the most economic means for separating the aromatics from both the antimony halide and the secondary solvent is heat stripping, it will be preferable to employ a secondary solvent which will not form azeotropic mixtures with the aromatics or antimony chloride. In general, the secondary solvent may be employed in an amount of from 100 to 1000 vol. percent based on aromatic feed, preferably, however, an amount from 200 to 500 vol. percent should be employed when selectively separating ethylbenzene from typical $C_8$ aromatics fractions such as mentioned above.

While the liquid antimony chlorides have the ability to generally extract aromatics from non-aromatic hydrocarbons, their primary value relates to their preferential affinity for different aromatic compounds. The liquid $SbCl_3$ will extract for example all four components of a mixture comprising the three isomeric xylenes and ethylbenzene. However, these extractants, in the presence of a secondary solvent, have the extremely desirable characteristic of preferentially extracting or solubilizing the aforesaid four components to markedly different degrees. As an example, $SbCl_3$ extracts o-xylene to a much greater extent than m-xylene, which in turn is extracted to a greater extent than p-xylene, and p-xylene is extracted or solubilized to a greater extent than ethylbenzene. Hence the ethylbenzene in the present process is recovered in greater purity from the raffinate rather than the extract phase.

From the separation factors and data which will be given subsequently, it will become apparent that these four components can be separated in any desired manner by utilization of the present invention. If desired, the o- and m-xylenes may be separated from p-xylene and ethylbenzene. Alternatively, the three xylenes may be separated from ethylbenzene and there are other separations which may be achieved and which will be apparent to those skilled in the art.

To demonstrate the high degree of effectiveness obtained by the use of the present process, reference is now had to the following example, which relates to a single stage liquid-liquid extraction of ethylbenzene and xylene mixtures.

*Example*

70 cc. of antimony trichloride were placed into a one-liter vessel at a temperature of 35° C. To the antimony trichloride there were added 95 cc. of a mixture of $C_8$ aromatics and 380 cc. of n-heptane having the following composition:

Hydrocarbon component: Vol. percent
o-Xylene _____ 23.6
m-Xylene _____ 21.5
p-Xylene _____ 27.4
Ethylbenzene _____ 27.7

The hydrocarbon mixture and antimony trichloride were stirred well for several minutes and then allowed to settle for about 15 minutes, until two liquid phases appeared. The phases were then separated into an upper oil phase or raffinate, and a lower antimony chloride or extract phase. Both phases were then washed with 6 molar HCl to remove antimony chloride and then analyzed by gas chromatography with the following results:

| Hydrocarbon Component | Bottom Extract Phase (Ex. $SbCl_3$), Wt. Percent | Upper Raffinate Phase (Ex. $SbCl_3$), Wt. Percent |
|---|---|---|
| o-Xylene | 17.2 | 2.3 |
| m-Xylene | 15.7 | 2.3 |
| p-Xylene | 18.0 | 3.1 |
| n-Heptane | 35.7 | 88.8 |
| Ethylbenzene | 13.4 | 3.5 |
| Antimony Trichloride, Vol. Percent (Based on total liquid in phase) | 60 | 9 |
| Hydrocarbons, Vol. Percent (Based on total liquid in phase) | 40 | 91 |

To obtain the separation factors in liquid-liquid extraction processes, the following formula was applied wherein all concentrations are in volume percent:

$$\frac{\text{Xylene isomer (extr.)}}{\text{Ethylbenzene (extr.)}} = \beta \frac{\text{Xylene isomer (raff.)}}{\text{Ethylbenzene (raff.)}}$$

Using the above formula, the following separation factors were obtained:

*Separation factors vs. ethylbenzene* n-Heptane _____ 0.102
o-Xylene _____ 1.95
m-Xylene _____ 1.78
p-Xylene _____ 1.52

As evidenced by the separation factors obtained by the single stage liquid-liquid extraction, high purity ethylbenzene can be separated from a mixture of xylenes by utilization of antimony halide referred to herein in a multistage design. Additional liquid-liquid extraction data are shown in the following table, the various columns representing separate runs.

*Table*

DISTRIBUTION OF $C_8$ AROMATICS BETWEEN ANTIMONY TRICHLORIDE AND n-$C_7$

| Run No | 1 | 2 | 3 | 4 | 5 | 6 |
|---|---|---|---|---|---|---|
| Feed, cc.: | | | | | | |
| Aromatics | 100 | 100 | 95 | 90 | 95 | 90 |
| n-Heptane | 265 | 240 | 360 | 480 | 380 | 615 |
| $SbCl_3$ | 75 | 75 | 70 | 65 | 70 | 65 |
| Cc. Extract | 135 | 158 | 108 | 88 | 80 | 60 |
| Cc. Raffinate | 295 | 298 | 417 | 547 | 500 | 755 |
| Composition of Original Feed, Vol. Percent: | | | | | | |
| o-Xylene | 22.7 | 23.6 | 23.6 | 23.6 | 22.7 | 22.7 |
| m-Xylene | 23.9 | 21.5 | 21.5 | 21.5 | 23.9 | 23.9 |
| p-Xylene | 26.7 | 27.4 | 27.4 | 27.4 | 26.7 | 26.7 |
| Ethylbenzene | 26.7 | 27.7 | 27.7 | 27.7 | 26.7 | 26.7 |
| $SbCl_3$ Phase: Oil Content of Extract, Vol. Percent | 62 | 55 | 50 | 40 | 40 | 34 |
| Composition of Extract Oil, Wt. Percent: | | | | | | |
| n-Heptane | 41.0 | 42.3 | 38.4 | 35.7 | 29.3 | 25.7 |
| o-Xylene | 15.1 | 14.9 | 15.6 | 17.2 | 19.0 | 20.7 |
| m-Xylene | 13.6 | 13.5 | 14.4 | 15.7 | 16.4 | 17.4 |
| p-Xylene | 15.4 | 15.6 | 17.7 | 18.0 | 20.2 | 21.4 |
| Ethylbenzene | 14.9 | 13.7 | 13.9 | 13.4 | 15.1 | 14.8 |
| Heptane Phase: Oil Content of Raff., Vol. Percent | 84 | 84 | 87 | 91 | 86 | 86 |
| Composition of Raff. Oil, Wt. Percent: | | | | | | |
| n-$C_7$ | 72.2 | 78.1 | 84.4 | 88.8 | 83.6 | 87.7 |
| o-Xylene | 6.1 | 4.7 | 3.0 | 2.3 | 3.6 | 2.6 |
| m-Xylene | 5.7 | 4.7 | 3.1 | 2.3 | 3.4 | 2.3 |
| p-Xylene | 7.8 | 6.1 | 4.5 | 3.1 | 4.4 | 3.5 |
| Ethylbenzene | 8.2 | 6.4 | 5.0 | 3.5 | 5.0 | 3.9 |
| Separation Factors vs. Ethylbenzene: | | | | | | |
| n-$C_7$ | 0.312 | 0.253 | 0.164 | 0.102 | 0.116 | 0.077 |
| o-Xylene | 1.36 | 1.53 | 1.87 | 1.95 | 1.75 | 2.10 |
| m-Xylene | 1.31 | 1.34 | 1.67 | 1.78 | 1.60 | 1.99 |
| p-Xylene | 1.09 | 1.19 | 1.41 | 1.52 | 1.52 | 1.61 |
| Temperature, °C | 35 | 35 | 35 | 35 | 35 | 35 |
| Pressure | (1) | (1) | (1) | (1) | (1) | (1) |

[1] Atmospheric.

A standard equation for calculating the number of stages required to obtain ethylbenzene of a given purity based on separation factors may be found in Industrial Engineering Chemistry (1937) vol. 29, p. 270. Using this equation it can be determined that with a separation factor of 1.61 such as obtained in Run No. 6 a 19-stage, e.g. plate, extraction process can be employed to obtain ethylbenzene of 99+% purity with 99% yields. If lower yields or if lower purity product, e.g. 95+%, are acceptable, fewer stages may be employed. The adaptation of this invention to a multistage commercial process is illustrated in simplified form by the drawing and following description thereof.

In the drawing there is shown a simplified blocked diagram of a multistage extraction process for the separation of ethylbenzene from a $C_8$ aromatics mixture such as described in the example. To avoid depicting a multiplicity of stages, broken lines are used to indicate that similar stages may be interjected between stages 2 and 19. In accordance with this process which may be carried out at essentially ambient temperatures and atmospheric pressures, the $C_8$ aromatics feed and n-heptane secondary solvent in amounts shown in the example are passed into the system via line 1. Vessels 2, 2a and 2b represent what in commercial practice would comprise mixing and settling stages which may comprise two or three vessels per stage, depending on the particular design employed.

In its abbreviated form, as shown in the simplified drawing, the aromatics feed is contacted with an antimony trichloride rich extract passed via lines 3 and 3a from a subsequent extraction stage. In vessels 2, 2a and 2b there are formed upper raffinate phases 4, 4a and 4b and lower extract phases 5, 5a and 5b. The first extract phase will contain major proportions of antimony trichloride with minor amounts of secondary solvent and a $C_8$ aromatics smear wherein the ratio of ethylbenzene to xylenes will be markedly lower than this ratio in the original aromatics feed which is passed into the system via line 1. The final extract is recovered via line 6 and the xylenes may be separated from antimony trichloride and secondary solvent by conventional means not shown. In this example fresh antimony trichloride is fed into the system via line 7 and will pass through the various stages, as indicated by the arrows. The upper raffinate phase 4 will comprise major proportions of the secondary solvent, in this case n-heptane, a smear of the $C_8$ aromatics and minor amounts of antimony trichloride. In the raffinate phases the ratio of ethylbenzene to xylenes will increase as the flow proceeds from stage 1 to stage 19 and whereas the extract phase will have decreasing ratios of ethylbenzene to xylenes as the extract phase flows from stage 19 to stage 1. The upper raffinate phases are passed through the various stages shown via lines 8 and 8a and will eventually be taken off as an ethylbenzene rich raffinate stream containing antimony trichloride and secondary solvent via line 9. Separation of the antimony trichloride, ethylbenzene and solvent can be effected by simple fractionation in a conventional tower 10 to recover relatively pure ethylbenzene overhead via line 11 and antimony trichloride as bottoms via line 12 and solvent as a sidestream via line 13.

By the process illustrated high purity ethylbenzene can be obtained; however, the yield will suffer somewhat due to the fact that some of the ethylbenzene will be extracted in the first stage with the xylenes to be taken off via line 6. If higher yields are desired the feed is preferably passed into the multistage extraction system at a stage intermediate the first and last, e.g. stage 9, as indicated by the dotted lines. In this case stages 9 through 19 will act as raffinate enriching stages wherein xylenes are extracted into the extract layer to effect higher ethylbenzene to xylene ratios in the raffinate, and the preceding stages, i.e. 8 through 1, will act as stripping stages wherein ethylbenzene in the extract will be stripped from the extract into each raffinate phase. This procedure will effect a substantially complete recovery of the ethylbenzene from the initial feed. Where the $C_8$ aromatics feed is passed into the system at an intermediate stage, at least some of the secondary solvent should enter the first stage to strip ethylbenzene from the extract into the raffinate phase.

Since the flow of raffinate is countercurrent to the flow of extract the term "subsequent stage" when applied to the raffinate will mean a higher numbered stage and when applied to the extract will mean a lower numbered stage.

In the above process it is preferred to employ a solvent such as n-heptane which boils substantially lower than ethylbenzene so that the recovery of ethylbenzene from the solvent is simplified.

Thus, in a multistage commercial unit the antimony trichloride solvent in the extract phase and passing countercurrent to the raffinate phase has in each subsequent stage a progressively decreasing ratio of ethylbenzene to xylenes, whereas the secondary solvent which passes through the system in the raffinate phase and in a countercurrent manner to the extract phase has in each subsequent stage a progressively increasing ratio of ethylbenzene to xylenes. This, as evidenced by the drawings, is accomplished by separating the raffinate and extract phases in each stage and subsequently contacting the raffinate from each phase with an extract phase as described until a final raffinate phase contains an ethylbenzene to xylenes ratio of >19:1, i.e. >95% pure, assuming the initial feed consisted essentially of xylenes and ethylbenzene.

The nature and objects of the present invention having been thus described and illustrated, what is claimed as new and useful is:

1. A process for concentrating ethylbenzene in a feed mixture containing it and xylenes which comprises contacting said feed mixture with liquid antimony halide and an inert non-aromatic hydrocarbon solvent which is less soluble in antimony halide than ethylbenzene in a ratio which will produce a liquid extract phase containing a lower concentration of ethylbenzene based on xylenes than in said feed mixture and a liquid raffinate phase containing a higher concentration of ethylbenzene based on xylenes than in said feed mixture.

2. A process in accordance with claim 1 wherein said antimony halide is an antimony chloride and said non-aromatic solvent is selected from the group consisting of paraffins, olefins and cycloparaffins.

3. A process for concentrating ethylbenzene in a feed mixture containing it and para-xylene which comprises contacting said feed mixture with 25 to 250 vol. percent of liquid antimony chloride and 100 to 1000 vol. percent of an inert non-aromatic hydrocarbon solvent, both based on aromatics in said feed mixture, to form separate extract and raffinate phases, recovering a raffinate phase containing a higher concentration of ethylbenzene based on para-xylene than in said feed mixture, and separating said non-aromatic hydrocarbon solvent from said raffinate phase to recover a concentrated ethylbenzene mixture.

4. A process in accordance with claim 3 wherein said antimony chloride is antimony trichloride and said non-aromatic hydrocarbon solvent is selected from the group consisting of paraffins, olefins and cycloparaffins.

5. A process for separating 95+% ethylbenzene from a less pure mixture containing predominantly ethylbenzene and xylenes which comprises contacting said less pure mixture in a plurality of extraction stages with antimony halide and sufficient inert non-aromatic hydrocarbon solvent to form raffinate and extract phases in each stage, wherein each subsequent stage will result in a raffinate phase having an increased ratio of ethylbenzene to xylenes, separating from a final stage a final raffinate containing an ethylbenzene to xylene ratio of at least 19:1 and recovering 95+% pure ethylbenzene from said final raffinate.

6. A process in accordance with claim 5 wherein the antimony halide and solvent employed in each of the extraction stages prior to the final stage are at least in part derived from the extract of a subsequent stage.

7. A multistage process for separating ethylbenzene of at least 95+% purity from a less pure mixture containing predominantly ethylbenzene and xylenes which comprises contacting said mixture in an intermediate stage with antimony trichloride and a paraffin solvent in amounts sufficient to form raffinate and extract phases, said raffinate phase containing a higher ratio of ethylbenzene to xylenes than said less pure mixture, passing raffinate through a plurality of subsequent extraction stages in contact with antimony trichloride and solvent whereby the raffinate phase formed in each subsequent stage contains a higher ratio of ethylbenzene to xylenes than each preceding stage until a final extraction stage produces a raffinate having an ethylbenzene to xylene ratio of at least 19:1, deriving at least a part of the antimony trichloride and solvent employed in each of the extraction stages prior to the final stage from the extract of a subsequent stage.

8. A process in accordance with claim 7 wherein ethylbenzene contained in the extract phases of the stages preceding said intermediate stage is stripped into raffinate phases by contact in said preceding stages with paraffin solvent.

9. A multistage liquid-liquid extraction process for the separation of ethylbenzene from xylenes contained in a mixture which comprises feeding said mixture into an extraction stage intermediate first and final stages, forming raffinate and extract phases in each stage of said process by intimately admixing ethylbenzene, xylenes, antimony chloride and an inert non-aromatic hydrocarbon solvent and allowing the admixture to settle, passing raffinate phases formed in each stage to a subsequent stage in a countercurrent manner to the flow of extract phases formed in each stage, maintaining sufficient hydrocarbon solvent and antimony chloride in each stage to form extract and raffinate phases whereby said raffinate phases contain increasing ratios of ethylbenzene to xylene in each subsequent stage and said extract phases flowing countercurrent to said raffinate phases contain decreasing ratios of ethylbenzene to xylenes.

10. A process in accordance with claim 9 wherein substantially lean solvent is passed into the first stage of said process and in each stage preceding said intermediate stage ethylbenzene is stripped from the extract into the raffinate phase.

11. A process in accordance with claim 9 wherein said hydrocarbon solvent is a paraffin and said antimony chloride is antimony trichloride.

References Cited by the Examiner
UNITED STATES PATENTS

| | | | |
|---|---|---|---|
| 2,246,257 | 6/41 | Kohn | 260—674 |
| 2,532,031 | 11/50 | Nixon et al. | 260—674 |
| 2,638,441 | 5/53 | Nixon et al. | 260—674 |
| 2,768,222 | 10/56 | Nixon et al. | 260—674 |
| 2,793,240 | 5/57 | Schaeffer et al. | 260—674 |

ALPHONSO D. SULLIVAN, *Primary Examiner.*